US011159046B1

(12) United States Patent
Kreikebaum et al.

(10) Patent No.: US 11,159,046 B1
(45) Date of Patent: Oct. 26, 2021

(54) DYNAMIC COMPUTATION AND CONTROL OF DISTRIBUTED ASSETS AT THE EDGE OF A POWER GRID

(71) Applicant: Smart Wires Inc., Union City, CA (US)

(72) Inventors: Frank Kreikebaum, Seattle, WA (US); Haroon Inam, San Jose, CA (US)

(73) Assignee: Smart Wires Inc., Union City, CA (US)

( * ) Notice: Subject to any disclaimer, the term of this patent is extended or adjusted under 35 U.S.C. 154(b) by 0 days.

(21) Appl. No.: 16/559,433

(22) Filed: Sep. 3, 2019

Related U.S. Application Data

(60) Provisional application No. 62/784,007, filed on Dec. 21, 2018.

(51) Int. Cl.
    *H02J 3/38* (2006.01)
    *H02J 13/00* (2006.01)
    *G05B 13/02* (2006.01)
    *H02J 3/32* (2006.01)

(52) U.S. Cl.
    CPC ........ *H02J 13/0017* (2013.01); *G05B 13/024* (2013.01); *H02J 3/32* (2013.01); *H02J 3/381* (2013.01); *H02J 2203/20* (2020.01)

(58) Field of Classification Search
    CPC .......... H02J 13/0017; H02J 3/381; H02J 3/32; H02J 2203/20; G05B 13/024
    USPC ........................................................ 700/287
    See application file for complete search history.

(56) References Cited

U.S. PATENT DOCUMENTS

| 6,747,372 | B2 | 6/2004 | Gilbreth et al. |
| 8,065,219 | B2 | 11/2011 | Haynie et al. |
| 8,429,435 | B1 | 4/2013 | Clayton et al. |
| 8,543,226 | B2 | 9/2013 | Shah et al. |
| 8,626,353 | B2 | 1/2014 | Ghosh et al. |
| 9,244,444 | B2 | 1/2016 | Carty et al. |

(Continued)

OTHER PUBLICATIONS

Amin, S. Massoud, et al., "Toward a Smart Grid", IEEE Power & Energy Magazine, Sep./Oct. 2005, pp. 34-41.

(Continued)

*Primary Examiner* — Kenneth M Lo
*Assistant Examiner* — Michael W Choi
(74) *Attorney, Agent, or Firm* — Womble Bond Dickinson (US) LLP

(57) ABSTRACT

A system enabling localized intelligent control with communication and coordination at local subsections of a power grid with information transfer to utility for supervisory control is disclosed. The disclosure extends the control and communication capability within, at the edge, and outside the edge of the power grid using intelligent and self-aware FACTS devices. Aspects of the disclosure enable control of a distribution network, energy storage systems and generation sources as an integrated system allowing optimization of power grid operation from generation to distribution. This control capability further enables a supervisory utility to implement and manage policy issues, such as standard compliance, carbon emission reduction, right-of-way management, and conformance to environmental regulations, such as EMI compliance, noise reduction, etc. This also allows the supervisory utility to optimize energy cost, network reliability, and asset utilization and life.

23 Claims, 5 Drawing Sheets

(56) References Cited

U.S. PATENT DOCUMENTS

| | | | |
|---|---|---|---|
| 9,575,472 B1 | 2/2017 | Clayton et al. | |
| 2009/0281677 A1 | 11/2009 | Botich et al. | |
| 2011/0282508 A1* | 11/2011 | Goutard | H04L 63/20 700/293 |
| 2012/0179301 A1* | 7/2012 | Aivaliotis | H02J 3/00 700/286 |
| 2017/0235286 A1* | 8/2017 | Inam | H02J 13/00007 700/295 |
| 2018/0098137 A1* | 4/2018 | Saha | G06Q 10/06316 |

OTHER PUBLICATIONS

Aquino-Lugo, Angel A., "Distributed and Decentralized Control of the Power Grid", Ph.D. Dissertation, University of Illinois at Urbana-Champaign, 2010, 172 pages total.

Kavitha, M., et al., "Integration of FACTS into Energy Storage Systems for Future Power Systems Applications", International Journal of Advanced Research in Electrical, Electronics and Instrumentation Engineering, vol. 2, Issue 2, Feb. 2013, pp. 800-810.

Koutsopoulos, Iordanis, et al., "Modeling and Optimization of the Smart Grip Ecosystem", Foundations and Trends in Networking, vol. 10, No. 2-3, 2015, Table of Contents, Abstract, Chapter 1, and References, 27 pages total.

Kumbhar, Mahesh Manik, et al., "Smart Grid: Advanced Electricity Distribution Network", IOSR Journal of Engineering, vol. 2, Issue 5, Jun. 2012, pp. 23-29.

Ramchurn, Sarvapali D., et al., "Putting the 'Smarts' into the Smart Grid: A Grand Challenge for Artificial Intelligence", Review Articles—Communication of the ACM, vol. 55, No. 4, Apr. 2012, pp. 86-97.

Renz, B. A., et al., "AEP Unified Power Flow Controller Performance", IEEE Transactions on Power Delivery, vol. 14, No. 4, Oct. 1999, pp. 1374-1381.

Schauder, C. D., et al., "Operation of the Unified Power Flow Controller (UPFC) Under Practical Constraints", IEEE Transactions on Power Delivery, vol. 13, No. 2, Apr. 1998, pp. 630-639.

Speer, Bethany, et al., "The Role of Smart Grids in Integrating Renewable Energy", ISGAN Synthesis Report, Annex 4, Task 3.2, Technical Report NREL/TP-6A20-63919, May 2015, 18 pages total.

Wang, Warren, et al., Dynamic Line Rating Systems for Transmission Lines, Topical Report, Smart Grip Demonstration Program, Apr. 25, 2014, 131 pages total.

* cited by examiner

DYNAMIC COMPUTATION AND CONTROL OF DISTRIBUTED ASSETS AT THE EDGE OF A POWER GRID

CROSS REFERENCE TO RELATED APPLICATIONS

This application claims the benefit of U.S. Provisional Application No. 62/784,007 filed on Dec. 21, 2018, the disclosure of which is incorporated herein by reference.

TECHNICAL FIELD

The present disclosure relates to systems for intelligent distributed control, from distributed generation to distributed loads, with supervision of a power grid system using a number of self-aware intelligent flexible alternating current transmission system (FACTS) based impedance injection modules (IIMs), storage device controllers and other FACTS devices to enable dynamic computation and control of distributed assets at the edge of the power grid.

BACKGROUND

Most prior art power utilities use energy management system (EMS)/supervisory control and data acquisition (SCADA) control systems for control of the power grid systems. These control systems provide connection and communication between the controllers and devices at the substations that are used to limit power flows and load imbalances over the grid lines and provide interactive control of the power transmission on the grid. Distributed and localized control of power flow over the HV and MV transmission lines using FACTS based IIMs has been proposed. The self-aware IIMs are able to identify and react very fast to the changes in the power line characteristics at a local level. These intelligent IIMs provide a capability to have localized control of line current and line balancing. This is to be described in FIG. 1 in more detail herein below.

The recent advances in non-conventional generation, such as wind, solar, geothermal, tidal and wave energy systems, that respond to unpredictable weather and environment-related characteristics and are dispersed across geographical locations, coupled with the cyclic nature of consumer demand for power, has made the optimization of power flow over the grid from generation to distribution based on models established and controlled by the utilities difficult.

The addition of power storage and other FACTS devices within and outside the edge of the grid are being attempted to improve the overall grid system performance. These FACTS and power storage devices coupled to the power grid need to be integrated with the power grid with control and communication capability to work efficiently.

In addition, environmental issues, health concerns, climate controls, view aesthetics, and regulations at various levels of governments are now forcing the utilities to deal with a set of new issues and initiatives when operating the power grids. It will be very useful to have the capability to integrate the new distributed FACTS-based control of generation capacity, the power storage devices and so on with compliances, regulations and rules into a single system with standardized control and communication capability. Such a capability will provide the power grid system with the capability to react to changes proactively using all the resources available to it before power related issues develop and become critical.

A system has been proposed in the co-pending U.S. patent application Ser. No. 15/428,906, with capability for fast response at local level, fast communication between system elements in the neighborhood for adaptive flow control and information transfer from the local centers established to the main control centers for supervisory action and assigned to the assignee of the current application. Such a system, when implemented with all the sub-system elements made intelligent, will be able to optimize the distributed power generation, use the power storage capabilities efficiently, maximize the effectiveness of new and advanced FACTS devices and provide efficient and optimized management of distribution of power while optimizing the grid operation, speeding up recovery from problems and improving grid utilization. Such a system or similar systems with communication and control capability, will be able to incorporate a set of policy/regulation/rule constraints for implementing a number of useful objective functions, using the intelligent integrated FACTS based control capability, to optimize energy cost, network reliability, and asset utilization and life.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
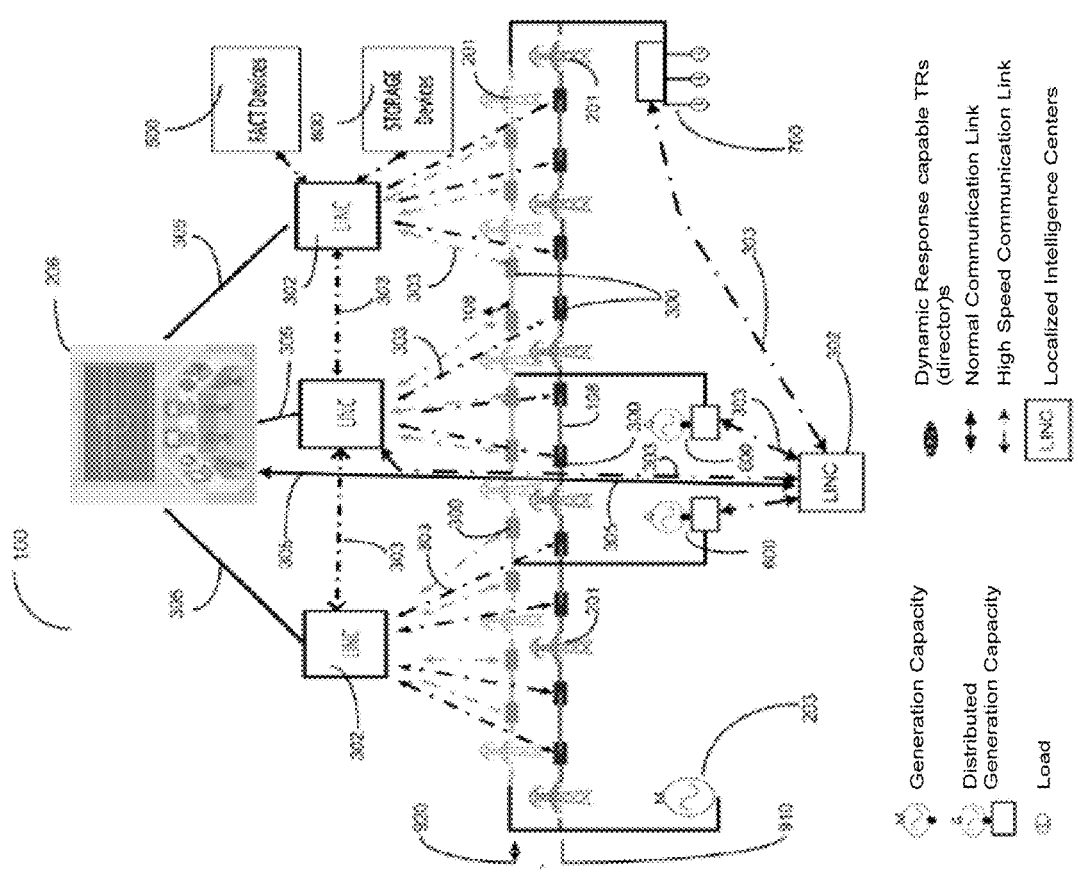
FIG. 1 is a block diagram illustrating a total power system from generation to distribution with distributed local sub-cyclic response capability and hierarchical monitoring and supervision capabilities.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

A system architecture for enabling localized intelligent control with communication and coordination of control at a local area of the grid with information transfer to utility for supervisory control has been proposed, and disclosed in co-pending U.S. application Ser. No. 15/428,906, the disclosure of which is incorporated herein by reference in its entirety.

The referred application extends a FACTS-based control and high-speed communication capability to all connections of sources, storage, and load to the power grid. The above mentioned invention uses intelligent and self-aware FACTS controller devices that include distributed or deployed IIMs for power flow control over the high-voltage (HV) and medium-voltage (MV) power lines of the grid, FACTS-based controller devices at and outside the edge of the power grid for controlling power sources, loads, storage, and other sensor devices that can sense the conditions of the surrounding and any changes in the characteristics of the components of the power system. An integrated communication capability with high-speed local communication and normal supervisory communication to a utility is proposed. The use of these intelligent connected FACTS devices hence provides an integrated capability for local conditions sensing and hierarchical control of the distribution network, storage devices, and the distributed generation sources. The invention also provides for high-speed communication for local coordination and control of the power system and normal communication to a utility for supervisory control.

This integrated control capability enables optimization of a power grid from generation to distribution. Incorporating real-time measurement data, including voltage, current, temperature, humidity, noise, wind speed, geomagnetically induced current (GIC) vibration, allows the optimization engine to extend the operational envelopes by dynamically de-rating line to match the current conditions without assuming the static worst-case operating scenarios. This control capability further enables the utility to automatically manage policy issues such as standard compliance, carbon emission limits, right-of-way management requirements and environmental issues such as EMI limits, sound emission limits, etc. This also allows the utility to optimize energy cost, network reliability, and asset utilization and life. The current application covers the optimized automatic management of policy issues using the self-aware and intelligent distributed FACTS controllers and sensors that are integrated across the power generation-distribution system with the high-speed local control capability and the supervisory control capability.

According to some embodiments, a high-voltage or medium-voltage power grid is described. The power grid includes localized intelligence centers, transmission lines to transport power at high-voltage or medium-voltage from power generators to substations or other distributed loads, sensors coupled to and collectively distributed over or deployed along the transmission lines, with each sensor being configured to measure environmental conditions of its respective transmission line, impedance injection modules (IIMs) coupled to and deployed along the transmission lines, with each IIM being configured to inject voltage or impedance into its respective transmission line and to communicate with at least one localized intelligence center, and a supervisory utility configured to communicate with the power generators, the substations, and the localized intelligence centers. In one embodiment, the localized intelligence centers, the sensors, the IIMs, and the supervisory utility collectively provide hierarchical monitoring and control of the power grid, with the IIMs locally responding to specific injection settings provided by the localized intelligence centers to control power flow of the transmission lines. In one embodiment, the localized intelligence centers provide the specific injection settings based on optimal decisions and settings received from the supervisory utility.

According to another embodiment, a system for hierarchical monitoring and control of a power grid is described. The system includes sensors coupled to and collectively distributed over or deployed along high-voltage (HV) or medium-voltage (MV) transmission lines of the power grid, with each sensor being configured to measure environmental conditions of its respective transmission line. The system further includes IIMs coupled to and deployed along the transmission lines, each IIM being configured to inject voltage or impedance into its respective transmission line and to communicate with at least one localized intelligence center. In one embodiment, the IIMs locally respond to specific injection settings provided by localized intelligence centers to control power flow of the transmission lines. In one embodiment, the localized intelligence centers provide the specific injection settings based on optimal decisions and settings received from a supervisory utility.

According to yet another embodiment, a method for hierarchical monitoring and control of a power grid is described. The method includes receiving environmental conditions of HV or MV transmission lines of the power grid. The method further includes receiving, from a number of IIMs coupled to and deployed along the transmission lines, voltage or current of the HV or MV transmission lines. The method further includes identifying objective functions and constraints, and determining optimal decisions and settings based on the environmental conditions of the transmission lines, the voltage or current of the transmission lines, the objective functions, and the constraints. And the method includes controlling power flow or voltage of the transmission lines using the optimal decisions and settings.

According to still another embodiment, a high-voltage or medium-voltage power grid is described. The power grid includes localized intelligence centers, transmission lines to transport power at high-voltage or medium-voltage from power generators to substations or other distributed loads, impedance injection modules (IIMs) coupled to and deployed along the transmission lines, with each IIM being configured to inject voltage or impedance into its respective transmission line and to communicate with at least one localized intelligence center, and a supervisory utility configured to communicate with the power generators, the substations, and the localized intelligence centers. In one embodiment, the localized intelligence centers, the sensors, the IIMs, and the supervisory utility collectively provide hierarchical monitoring and control of the power grid, with the IIMs locally responding to specific injection settings provided by the localized intelligence centers to control power flow of the transmission lines. In one embodiment, the localized intelligence centers provide the specific injection settings based on optimal decisions and settings received from the supervisory utility.

The invention disclosed is generally directed at providing a capability for the power generation-distribution system to achieve optimized operation capability while meeting policy goals. This is possible with the use of distributed or deployed IIMs on the power grid and the FACTS based intelligent and distributed control of the connected generators, loads, storage devices, and control devices at the edge of the grid. In addition, FACTS based sensor modules and independent sensors are also implemented on the power system that can sense any changes in the local environment and any changes in the characteristics of the components of the power system.

FIG. 1 is a block diagram illustrating a total power system from generation to distribution with distributed local sub-cyclic response capability and hierarchical monitoring and supervision capabilities. In one embodiment, total power system 100 of FIG. 1 may be the total power system described in co-pending U.S. application Ser. No. 15/428, 906, entitled "Dynamic and Integrated Control of Total Power System Using Distributed Impedance Injection Modules and Actuator Devices within and at the Edge of the Power Grid."

As shown, system 100 includes generation capacity 203 that is connected to the HV/MV power grids enabled for power transfer over the high-voltage and medium-voltage transmission lines 108 suspended from transmission towers 201. In FIG. 1, there are two HV/MV power grids 910 and 920, though any number of power grids may exist in system 100 and associated distributed impedance injection modules (IIMs) 300, and actuator devices 500 that are enabled with distributed standardized control and communication capabilities. HV/MV power grids 910 and 920 are the HV/MV power transmission systems that transport power at high-voltage or medium-voltage from the power generators to the sub-stations or other distributed loads. Distributed or deployed IIMs 300 are attached to the HV/MV power grids 910 and 920 to control the power flow or voltage on the HV/MV transmission lines 108. Distributed or deployed IIMs 300 may be self-aware with built-in capability or intelligence to recognize problems on transmission lines 108. Actuator devices 500 may be FACTS devices connected to the HV/MV power grids 910 and 920 enabled with high-speed (sub-cyclic) communication capability and FACTS-based control capability. In one embodiment, actuator devices 500 may include one or more of: static synchronous series compensators (SSSC), static synchronous compensators (STATCOMs), unified power-flow controllers (UPFCs), interline power-flow controllers (IPFCs), and/or other electronic systems for monitoring and control of the power flow or voltage over the HV/MV power grids 910 and 920.

Still referring to FIG. 1, system 100 uses the capabilities established for sub-cyclic control and appropriate communication for all the distributed or deployed IIMs 300, actuator devices 500, and miscellaneous FACTS-coupled devices, such as distributed generators 600, energy storage devices 800, etc., that are inside, at the edge and outside the edge of the power grids 910 and 920 to provide a distributed but integrated sub-cyclic control and response capability to the total power system. These enable optimization of the operation of the total power system 100 from generation to distribution. Distributed generators 600 refers to the distributed generation capability (other than the large conventional generation stations) that could be inside, at, or outside the edge of the HV/MV power grids 910 and 920 but are coupled to the HV/MV power grids 910 and 920 with FACTS-based control capability and enabled with high speed communication capability. These include, for example, wind energy farms, solar energy farms, bioenergy units, wave energy units, etc. that are typically non-conventional producers of energy. This also may include all conventional distributed generation sources but not traditional large generation capabilities, such as pre-existing thermal power plants, atomic power plants, hydroelectric plants etc., that are controlled directly by the supervisory utility 206. Supervisory utility 206 refers to the supervisory entity enabled for central monitoring, modelling and control of total power system 100 having communication links to the LINCs 302 for data collection and providing system control. Energy storage devices 800 are distributed energy storage capability typically inside, at, or outside, the edge of the HV/MV power grids 910 and 920 but coupled to the HV/MV power grids 910 and 920 with or without FACTS-based control and enabled with high speed communication. The edge of the HV/MV power grids 910 and 920 refers to a boundary of the HV/MV power grids 910 and 920, with some temporal and/or spatial functionality outside the direct control of utilities and distribution operators.

In FIG. 1, the distributed or deployed IIMs 300, local intelligence centers (LINCs) 302, actuator devices 500, energy storage devices 800, and distributed generators 600, as well as distributed loads with demand-response capabilities 700, are all with control capability that is typically FACTS-based and are interconnected locally using the high-speed communication provided by high-speed communication links 303 associated with each of the devices. This communication capability is provided through the nearest LINC 302, shown in FIG. 1, for localized communication and control supervision. In one embodiment, distributed loads 700 refer to power distribution systems that are inside, at, or outside the edge of the HV/MV power grids 910 and 920 but are coupled to the HV/MV power grids 910 and 920 with or without FACTS-based control and enabled with high speed communication.

The LINCs 302 are also interconnected with high-speed link connections for high-speed inter-LINC communication between neighboring local areas. The LINCs 302 are further connected to supervisory utility 206 using communication connections 305, which may be slower than the high-speed connection links 303, to enable data transfer and overall supervisory control of the total power system 100.

Figure 2:
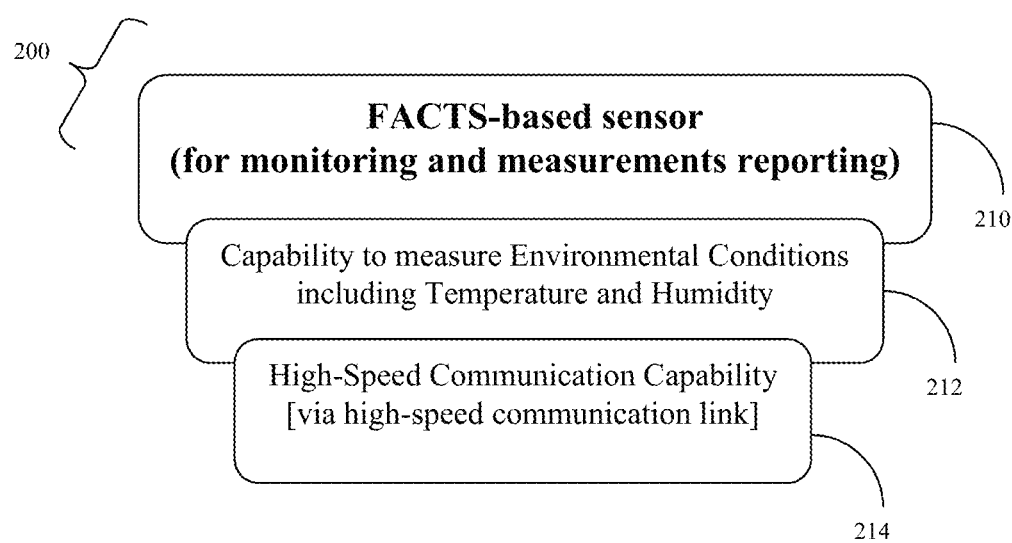
FIG. 2 is a diagram illustrating a FACTS-based sensor module according to one embodiment.

FIG. 2 is a diagram illustrating a FACTS-based sensor module according to one embodiment. In FIG. 2, FACTS based sensor module 200 may include FACTS based sensor 210 having capability 212 to measure and report environmental conditions, including temperature, humidity, noise, wind speed, geomagnetically induced current (GIC) vibration, using high-speed communication capability 214 (e.g., high-speed transceiver) to one or more LINCs 302, with connectivity through high speed communication links 303 (as shown in FIG. 1) to provide the sub-cyclic local response. In one embodiment, FACTS-based sensor module 200 can be built-in as part of IIM 300, or completely independent from IIM 300 but communicating to IIMs 300 or LINCs 302 with its high-speed communication capability 214.

Figure 3:
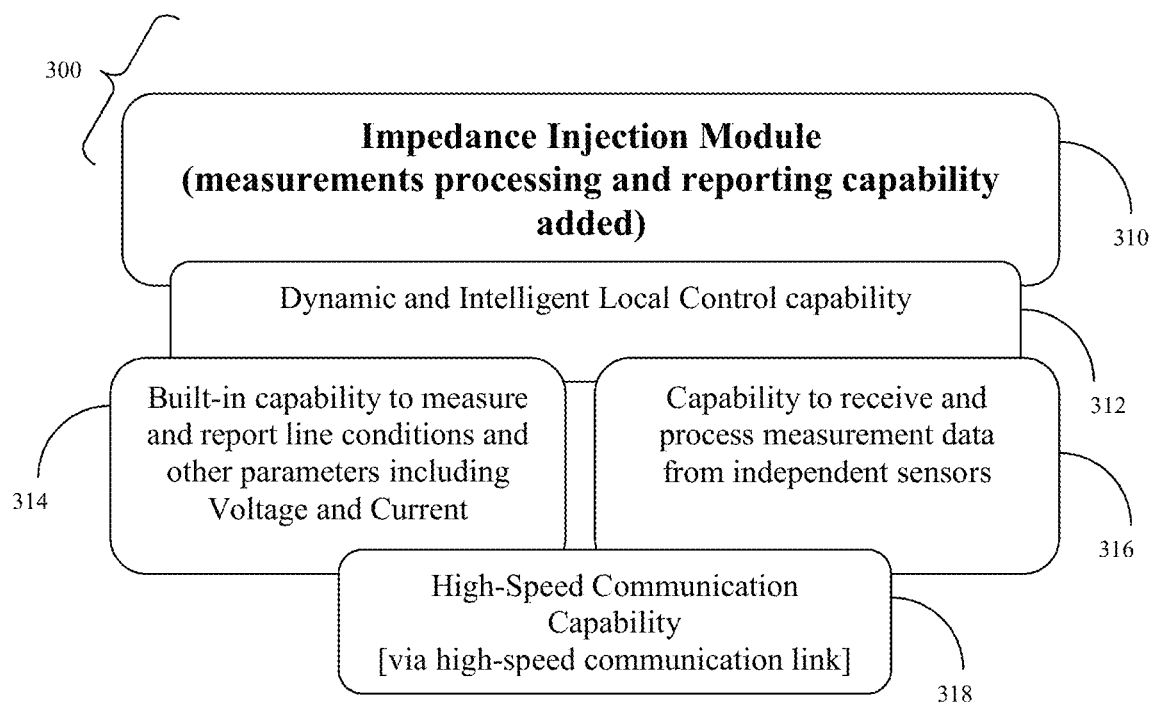
FIG. 3 is a diagram illustrating an impedance injection module (IIM) according to one embodiment.

FIG. 3 is a diagram illustrating an impedance injection module (IIM) according to one embodiment. Referring to FIG. 3, an enhanced IIM 300 includes measurements processing and reporting capability 310 added to standard dynamic and intelligent local control capability 312. The built-in capability 314 can measure and report line conditions, including voltage and/or current, while capability 316 can receive and process measurement data from other independent sensors. Using high-speed communication capability 318, IIM 300 may communicate with one or more LINCs 302 and independent sensors through high-speed communication links 303. In one embodiment, IIM 300 may respond to specific injection settings provided by LINCs 302 by injecting voltage or impedance into a transmission line (e.g., HV/MV transmission lines 108).

The real-time measurement data allow the supervisory utility 206 to push the operational envelopes of the power grid (e.g., power grid 910 or 920) as an optimization engine (as described in more detail herein below) can use them to increase the utilization of the overall system by not having to assume the static worst-case operating scenarios of the rated components.

Figure 4:
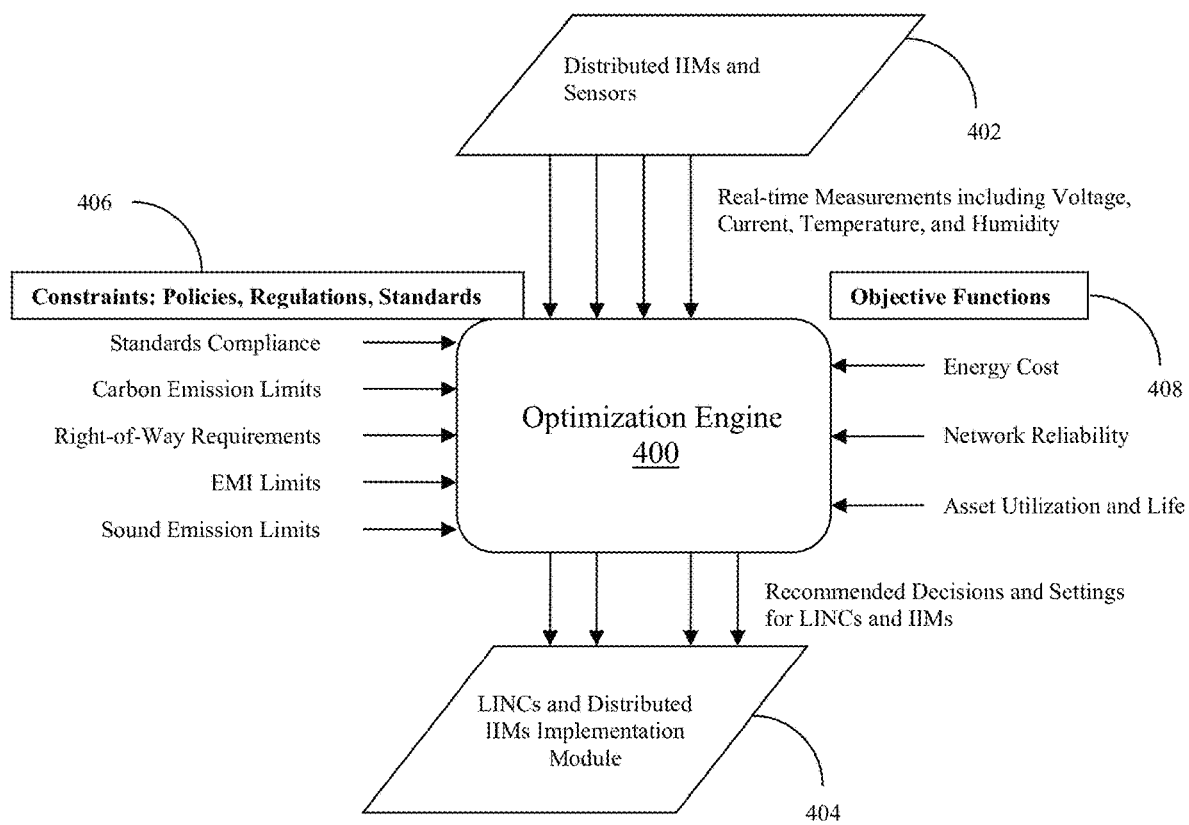
FIG. 4 is a diagram illustrating an exemplary optimization engine according to one embodiment.

FIG. 4 is a diagram illustrating an exemplary optimization engine according to one embodiment. In one embodiment, the optimization engine may be performed by a supervisory utility (e.g., supervisory utility 206 of FIG. 1). In FIG. 4, optimization engine 400 with its external interfacing modules, the measurement input module from the distributed or deployed IIMs and sensors 402, and LINCs and distributed or deployed IIMs implementation module 404. Optimization engine 400 is further configured to take input parameters, such as the policies and local requirements or rules as constraints 406, and energy cost, network reliability, and asset utilization and life as objective functions 408. Optimization engine 400 incorporates also the real-time measurements, including current, voltage, temperature, humidity, noise, wind speed, geomagnetically induced current (GIC) vibration, as provided by distributed or deployed IIMs and sensors 402, to perform comprehensive dynamic line rating (DLR) and real-time thermal rating (RTTR) as opposed to static worst-case engineering operating assumptions. The inclusion of the real-time sensor measurements can improve and enhance the utilization of the whole power grid. In one embodiment, constraints 406 and/or the real-time measurements are utilized to optimize (e.g., minimize or maximize) at least one of the objective functions 408.

Constraints consist of policies, regulations, and standards 406 on the power system include standard compliance, carbon emission limits, right-of-way management requirements, and other local environmental issues such as EMI limits, sound emission limits, etc.

1. Standard compliance: By using the intelligent IIMs distributed over or deployed along the high-voltage power and medium-power lines of the grid, the utility is able to establish rules to be implemented by the distributed or deployed IIMs injecting impedance or voltage for optimized power transfer capabilities of the plurality of power grids connecting the generators to distribution points, and keep the grid operating within the standard compliance limits of current and voltage.

2. Carbon emission limits: Use of least carbon-intensive energy sources from environmentally friendly wind, solar, geothermal, tidal or wave sources for demand fluctuations allow the system to reduce and optimize the carbon emission and meet policy constraints set by the government and the utility.

3. Right-of-way management requirements: In some areas there are constraints that limit the power line rating during certain time periods. It is difficult for the utility to control this and accept right-of-way in these locations. By having the local control capability to adjust power transfer over HV and MV power lines of the grid based on pre-established rules, the utility is able to cater to the local rules and constraints and still use the right-of-way.

4. Electromagnetic Interference (EMI) limits: This again can be linked to the local environmental needs established, which specify EMI limits during certain times for the safety and health of the local population. By having the ability to limit the current through the power grid and divert power to alternate grid connections during these times, the utility is able to cater to the needs and requirements of the local administration and still utilize the available capacity of these HV and MV power lines.

5. Sound emission limits: This again can be linked to the local environmental needs established, which specify limits for the fundamental frequency, e.g., 50 or 60-Hz, 60-Hz, hum of the power lines during quiet times for the comfort and health of the local population. By having the ability to limit the current through the power grid and divert power to alternate grid connections during these times, the utility is able to cater to the needs and requirements of the local administration and still utilize the available capacity of these HV and MV power lines.

While meeting these requirements, this optimization engine aims to optimize a set of objective functions 408, including energy cost, network reliability and asset utilization and life.

1. Optimization of energy cost: Energy cost has multiple components, including where the power is purchased from, how generators are scheduled, power transfer efficiency of the grid, etc. Having a unified control capability using edge connected FACTS controllers allows lowest-cost power sourcing into the grid at any time from the power generation capability, such as standard generators, distributed generators or stored power, using per established rules. This facilitates the lowest-cost energy sources and storage to be used while employing the next level (cost-wise more expensive) sources to cover intermittent and peak demands. Using the distributed or deployed IIMs to enable optimized power transfer over the grid also reduce the losses in transmission and reduce the cost of power.

2. Optimization of network reliability: With real-time line conditions and information, new generators can be brought online as necessary and power flow can be re-distributed by the optimization engine to improve network reliability and avoid outage with appropriately defined reliability metrics.

3. Optimization of asset utilization and life: Most of the elements of the grid and attached devices, such as HV and MV power lines, switches, transformers, connectors, etc. have a normal power handling capability and a peak power handling capability. The power ratings are also impacted by the local environmental conditions. The optimal power capability has to be de-rated, under adverse local conditions, for the devices to maintain lifetime of the asset. Using the power system elements at the higher stress level as provided by the peak power capability even for short periods of time tends to reduce their life expectancy due to accelerated aging. By having an integrated control capability, with localized fast control capability established by the high-speed communication links, the utility can establish power handling rules that can be implemented by the connected sensors and control modules to limit any overstressing of the various elements and devices on the grid even under adverse local conditions. By having an integrated communication and control capability it is possible to have a more level and even utilization of resources as demands change and availability change on the power system. The sensors and FACTS based controllers, working together with the supervisory utility, are able to control the input from the sources and storage resources, and to control the flow of power in the available power lines of the grid in a timelier fashion to use all available resources optimally. This utilization optimization leads to better asset life management and improves the return on investment for the utilities.

Based on policy related requirements, the output of the engine 400 produces decisions and changes (i.e., recommended or optimal decisions and settings) for LINCs 302 and impedance IIMs 300 for implementation. The distributed or deployed IIMs and other FACTS-based controllers implement the optimization based on local conditions identified and constraints provided to the optimization engine. Additionally, high-level commands such as priorities and weighting factors can be sent to the controllers to fine-tune the implementations at each controller.

All the inputs and outputs are most likely to be location-specific and time-dependent in the optimization process.

Figure 5:
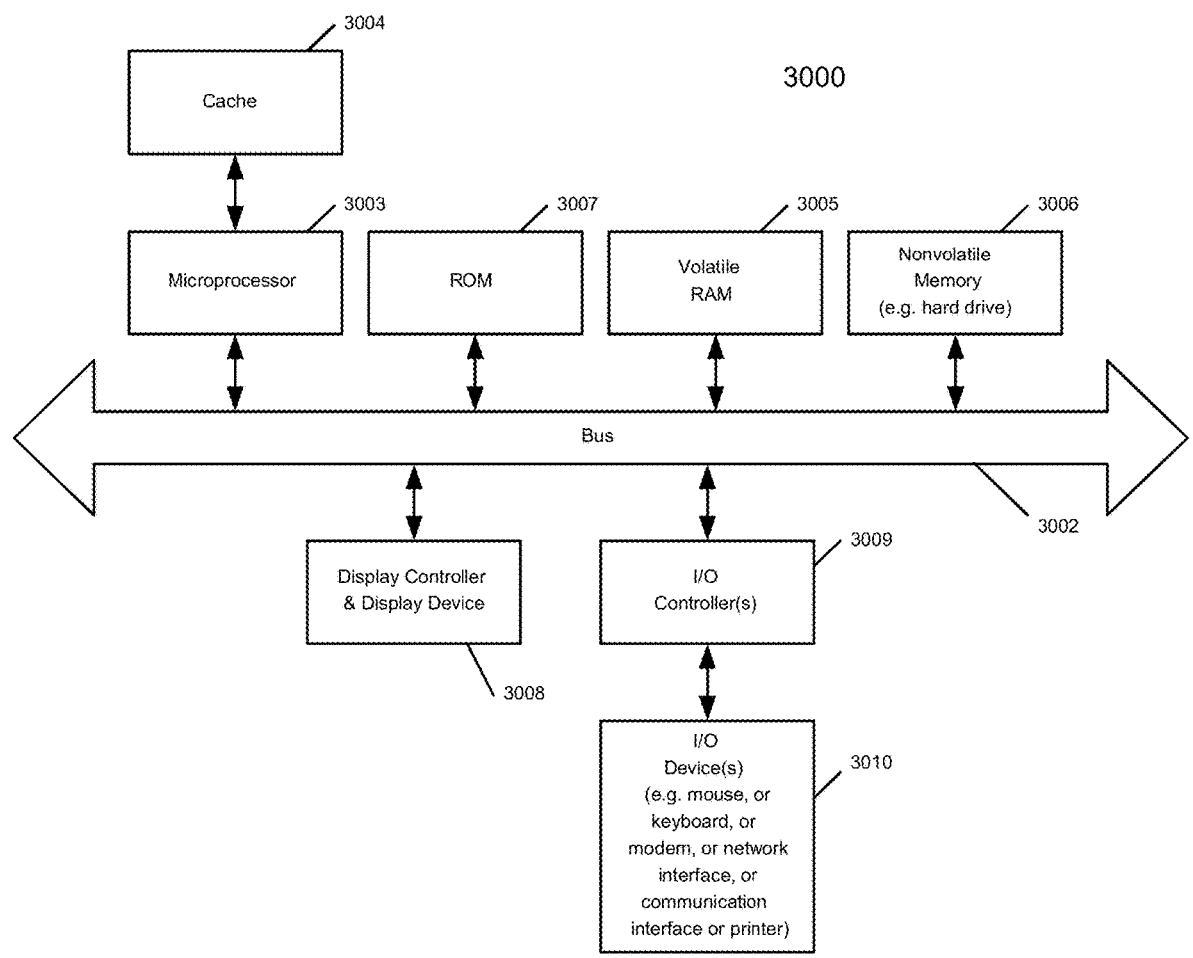
FIG. 5 is a block diagram of a data processing system, which may be used with one embodiment of the invention.

FIG. 5 is a block diagram of a data processing system, which may be used with one embodiment of the invention. For example, the system 3000 may be used to execute engine 400 as shown in FIG. 4. In one embodiment, system 3000 may be disposed within supervisory utility 206, as shown in FIG. 1. Note that while FIG. 5 illustrates various components of a computer system, it is not intended to represent any particular architecture or manner of interconnecting the components; as such details are not germane to the invention. It will also be appreciated that network computers, handheld computers, mobile devices (e.g., smartphones, tablets) and other data processing systems which have fewer components or perhaps more components may also be used with the invention. The system 3000 of FIG. 5 may, for example, be a host or a server.

As shown in FIG. 5, the system 3000, which is a form of a data processing system, includes a bus or interconnect 3002 which is coupled to one or more microprocessors 3003 and a ROM 3007, a volatile RAM 3005, and a non-volatile memory 3006. The microprocessor 3003 is coupled to cache memory 3004. The bus 3002 interconnects these various components together and also interconnects these components 3003, 3007, 3005, and 3006 to a display controller and display device 3008, as well as to input/output (I/O) devices 3010, which may be mice, keyboards, modems, network interfaces, printers, and other devices which are well-known in the art.

Typically, the input/output devices 3010 are coupled to the system through input/output controllers 3009. The volatile RAM 3005 is typically implemented as dynamic RAM (DRAM) which requires power continuously in order to refresh or maintain the data in the memory. The non-volatile memory 3006 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 5 shows that the non-volatile memory is a local device coupled directly to the rest of the components in the data processing system, a non-volatile memory that is remote from the system may be utilized, such as, a network storage device which is coupled to the data processing system through a network interface such as a modem or Ethernet interface. The bus 3002 may include one or more buses connected to each other through various bridges, controllers, and/or adapters, as is well-known in the art. In one embodiment, the I/O controller 3009 includes a Universal Serial Bus (USB) adapter for controlling USB peripherals. Although not shown in FIG. 5, I/O controller 3009 may further include a network interface device that may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

While the disclosure has been described in terms of several embodiments, those of ordinary skill in the art will recognize that the invention is not limited to the embodiments described, but can be practiced with modification and alteration known to practitioners of the art. These modifications and alternate practices, though not explicitly described, are covered under the current application. The practice of the invention is further covered within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A high-voltage or medium-voltage power grid, comprising:
   a plurality of localized intelligence centers;
   transmission lines to transport power at high-voltage or medium-voltage from power generators to substations or other distributed loads;
   a plurality of sensors coupled to and collectively distributed over or deployed along the transmission lines, each sensor being configured to measure environmental conditions of its respective transmission line in real-time;
   a plurality of impedance injection modules (IIMs) coupled to and deployed along the transmission lines, each IIM being configured to sense real-time current or voltage on its respective transmission line, to inject voltage or impedance into the respective transmission line, and to communicate with at least one localized intelligence center; and
   a supervisory utility configured to:
      communicate with the localized intelligence centers,
      identify constraints and at least one objective function,
      receive the real-time environmental conditions measured by the sensors and the sensed real-time currents or voltages on the transmission lines,
      utilize the constraints, the real-time environmental conditions measured by the sensors, and the sensed real-time currents or voltages on the transmission lines to achieve the at least one objective function, and
      produce decisions and settings based on the constraints, the real-time environmental conditions measured by the sensors, and the sensed real-time currents or voltages on the transmission lines for achieving the at least one objective function;
   wherein the localized intelligence centers, the sensors, the IIMs, and the supervisory utility collectively provide hierarchical monitoring and control of the power grid, with the IIMs locally responding to specific injection settings provided by the localized intelligence centers to control power flow of the transmission lines;
   wherein the localized intelligence centers provide the specific injection settings based on the decisions and settings produced by the supervisory utility.

2. The power grid of claim 1, wherein the environmental conditions include at least one of: temperature, humidity, noise, wind speed, or geomagnetically induced current (GIC) vibration.

3. The power grid of claim 1, wherein the decisions and settings are determined based on: (i) the at least one objective function, (ii) the constraints, (iii) the measured environmental conditions from the sensors, and (iv) the sensed real-time voltage or current of at least one of the transmission lines.

4. The power grid of claim 3, wherein
   the at least one objective function includes energy cost, network reliability, or asset utilization and life,
   the constraints include at least one of: standard compliance of current and voltage, carbon emission limits, right-of-way requirements, electromagnetic interference (EMI) limits, or sound emission limits.

5. The power grid of claim 3, wherein the constraints, measured environmental conditions, and measured voltage or current of the at least one of the transmission lines are utilized to achieve the at least one objective function.

6. The power grid of claim 1, wherein each sensor includes a high-speed transceiver to communicate the environmental conditions to the localized intelligence centers through high-speed communication links to provide the sub-cyclic local response.

7. The power grid of claim 1, further comprising energy storage devices coupled to the power grid.

8. The power grid of claim 1, wherein each IIM is further configured to measure at least one of voltage or current of its respective transmission line.

9. The power grid of claim 8, wherein each IIM includes a high-speed transceiver to report the at least one of voltage or current to the at least one localized intelligence center through a high-speed communication link.

10. The power grid of claim 9, wherein the communications between the supervisory utility and the localized intelligence centers are performed through a communication link slower than the high-speed communication link.

11. The power grid of claim 1, wherein the plurality of IIMs are distributed over the transmission lines or disposed in a substation.

12. A system for hierarchical monitoring and control of a power grid, the system comprising:
  a plurality of sensors coupled to and collectively distributed over or deployed along high-voltage (HV) or medium-voltage (MV) transmission lines of the power grid, each sensor being configured to measure environmental conditions of its respective transmission line in real-time; and
  a plurality of impedance injection modules (IIMs) coupled to and deployed along the transmission lines, each IIM being configured to inject voltage or impedance into its respective transmission line and to communicate with at least one localized intelligence center;
  wherein the IIMs locally respond to specific injection settings provided by localized intelligence centers to control power flow of the transmission lines;
  wherein the localized intelligence centers provide the specific injection settings based on decisions and settings received from a supervisory utility;
  wherein the decisions and settings are determined, at the supervisory utility, based on constraints, the real-time environmental conditions measured by the sensors, and at least one objective function;
  wherein the constraints and the real-time environmental conditions are utilized, at the supervisory utility, to achieve the at least one objective function.

13. The system of claim 12, wherein the environmental conditions include at least one of: temperature, humidity, noise, wind speed, or geomagnetically induced current (GIC) vibration.

14. The system of claim 12, wherein the decisions and settings are further determined based on measured voltage or current of at least one of the transmission lines in real-time.

15. The system of claim 14, wherein
  the at least one objective function includes energy cost, network reliability, or asset utilization and life,
  the constraints include at least one of: standard compliance of current and voltage, carbon emission limits, right-of-way requirements, electromagnetic interference (EMI) limits, or sound emission limits.

16. The system of claim 14, wherein the constraints, the measured environmental conditions, and the measured voltage or current of the at least one of the transmission lines are utilized to achieve the at least one objective function.

17. The system of claim 12, wherein each IIM is further configured to measure at least one of voltage or current of its respective transmission line.

18. A method for hierarchical monitoring and control of a power grid, the method comprising:
  receiving, by a supervisory utility, from a plurality of sensors coupled to and collectively distributed over or deployed along high-voltage (HV) or medium-voltage (MV) transmission lines of the power grid, real-time environmental conditions of the HV or MV transmission lines, each sensor being configured to measure environmental conditions of its respective transmission line in real-time;
  receiving, by the supervisory utility, from a plurality of impedance injection modules (IIMs) coupled to and deployed along the transmission lines, measured voltages or currents of the HV or MV transmission lines, each IIM being configured to measure current or voltage of its respective transmission line, at a transmission line segment of the respective transmission line to which the IIM is coupled, in real-time and to inject voltage or impedance into the respective transmission line;
  identifying, by the supervisory utility, at least one objective function and constraints;
  utilizing, by the supervisory utility, the environmental conditions of the HV or MV transmission lines, the measured voltages or currents of the HV or MV transmission lines, and the constraints, to achieve the at least one objective function;
  determining, by the supervisory utility, decisions and settings for controlling the power grid based on the environmental conditions of the HV or MV transmission lines, the measured voltages or currents of the HV or MV transmission lines, and the constraints; and
  communicating, by the supervisory utility, the decision and settings to a plurality of localized intelligence centers;
  wherein the localized intelligence centers provide specific injection settings to the IIMs based on the decision and settings;
  wherein the IIMs locally respond to the specific injection settings to control power flow of the transmission lines.

19. The method of claim 18, wherein:
  the environmental conditions are communicated from the sensors to the localized intelligence centers; and
  the measured voltages or currents of the HV or MV transmission lines are communicated from the IIMs to the localized intelligence centers.

20. The method of claim 18, wherein the environmental conditions include at least one of: temperature, humidity, noise, wind speed, or geomagnetically induced current (GIC) vibration.

21. The method of claim 18, wherein
  the at least one objective function includes energy cost, network reliability, or asset utilization and life,
  the constraints include at least one of: standard compliance of current and voltage, carbon emission limits, right-of-way requirements, electromagnetic interference (EMI) limits, or sound emission limits.

22. The method of claim 18, wherein determining the decisions and settings comprises minimizing or maximizing the at least one objective function using the environmental conditions of the HV or MV transmission lines, the measured voltages or currents of the HV or MV transmission lines, and the constraints.

23. A high-voltage or medium-voltage power grid, comprising:
- a plurality of localized intelligence centers;
- transmission lines to transport power at high-voltage or medium-voltage from power generators to substations or other distributed loads;
- a plurality of impedance injection modules (IIMs) coupled to and deployed along the transmission lines, each IIM being configured to inject voltage or impedance into its respective transmission line and to communicate with at least one localized intelligence center; and
- a supervisory utility configured to: communicate with the localized intelligence centers, receive constraints and real-time environmental conditions of the transmission lines, utilize the constraints and the real-time environmental conditions to achieve at least one objective function, and produce decisions and settings based on the constraints and the real-time environmental conditions;
- wherein the localized intelligence centers, the IIMs, and the supervisory utility collectively provide hierarchical monitoring and control of the power grid, with the IIMs locally responding to specific injection settings provided by the localized intelligence centers to control power flow of the transmission lines;
- wherein the localized intelligence centers provide the specific injection settings based on the decisions and settings produced by the supervisory utility.

* * * * *